United States Patent
Marshall et al.

(10) Patent No.: US 6,662,252 B1
(45) Date of Patent: Dec. 9, 2003

(54) GROUP AND VIRTUAL LOCKING MECHANISM FOR INTER PROCESSOR SYNCHRONIZATION

(75) Inventors: John William Marshall, Cary, NC (US); Kenneth H. Potter, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/314,748

(22) Filed: Dec. 8, 2002

Related U.S. Application Data (63) Continuation of application No. 09/432,464, filed on Nov. 3, 1999, now Pat. No. 6,529,983.

(51) Int. Cl.[7] ............................................. G06F 12/00
(52) U.S. Cl. ...................................................... 710/200
(58) Field of Search ................................. 710/200, 108; 709/213, 214, 215, 248, 200; 707/8; 711/100, 147, 150, 153, 163, 168

(56) References Cited

U.S. PATENT DOCUMENTS

| | | | |
|---|---|---|---|
| 4,071,887 A | 1/1978 | Daly et al. | 364/200 |
| 4,404,557 A | 9/1983 | Grow | 340/825.05 |
| 4,495,617 A | 1/1985 | Ampulski et al. | 370/86 |
| 4,512,014 A | 4/1985 | Binz et al. | 370/84 |
| 4,530,091 A | 7/1985 | Crockett | 370/60 |

(List continued on next page.)

OTHER PUBLICATIONS

*Cisco Catalyst Workgroup Switch Version 3.0,* web, http://www.cisco.com/warp/public/558/16.html, pp. 1–5.
Cisco VLAN Roadmap, web, http://www.cisco.com/warp/public/538/7.html, pp. 1–9.
*IAC (SM) Newsletter Database (TM) Communications Industry Researchers, Broadband Networks and Applications,* copyright 1995 Information Access Company, a Thomson Corporation Company, Section No. 16, vol. E; ISSN: 1059–0544, Headline, *Cisco Announces New Fast Ethernet Interface,* pp. 2–3.
*IAC (SM) Newsletter Database (TM) Communications Industry Researchers, Broadband, Networks and Applications,* copyright 1995 Information Access Company, a Thomson Corporation Company, Section No. 16, vol. 3; ISSN: 1059–0544, Headline, *Cisco Announces Token–Ring Switching Products,* pp. 4–5.
*Cisco 7000 Series Gains Fast Ethernet Interface, Becomes Only Router Family to Support Three High–Speed Network Types,* web, http://www.cisco.com/warp/public/146/199.html pp. 1–2.
*ISL Functional Specification,* web, http://www.cisco.com/warp/public/741/4.htm, pp. 1–4.
*Cisco–Catalyst 5000 Software Release 2.1 Feature Set,* web, http://www.cisco.com/warp/public/729/c5000/426_pp.htm, pp. 1–9.

(List continued on next page.)

*Primary Examiner*—Xuan M. Thai
(74) *Attorney, Agent, or Firm*—Cesari and McKenna, LLP (57) ABSTRACT

A group and virtual locking mechanism (GVLM) addresses two classes of synchronization present in a system having resources that are shared by a plurality of threads of execution: (1) synchronization of the multi-access shared resources; and (2) simultaneous requests for the shared resources. Broadly stated, the novel GVLM comprises a lock controller function associated with each thread of execution, and lock instructions executed by the threads that manipulate the lock controller to create a tightly integrated arrangement for issuing lock requests to the shared resources. The plurality of threads of execution may each execute in a different processor. Alternatively, the plurality of threads of execution may each execute in a single processor.

28 Claims, 7 Drawing Sheets

U.S. PATENT DOCUMENTS

| | | | |
|---|---|---|---|
| 4,536,876 A | 8/1985 | Bahr et al. .................. 370/86 |
| 4,539,679 A | 9/1985 | Bux et al. .................... 370/88 |
| 4,543,630 A | 9/1985 | Neches ...................... 364/200 |
| 4,549,291 A | 10/1985 | Renoulin et al. ............ 370/89 |
| 4,589,092 A | * 5/1986 | Matick ...................... 711/207 |
| 4,590,554 A | 5/1986 | Glazer et al. ............... 364/200 |
| 4,598,400 A | 7/1986 | Hillis |
| 4,604,742 A | 8/1986 | Hamada et al. .............. 370/89 |
| 4,609,920 A | 9/1986 | Segarra ................. 340/825.51 |
| 4,663,748 A | 5/1987 | Karbowiak et al. ........... 370/89 |
| 4,677,614 A | 6/1987 | Circo ........................ 370/86 |
| 4,680,757 A | 7/1987 | Murakami et al. ............ 370/89 |
| 4,704,680 A | 11/1987 | Saxe ........................ 364/200 |
| 4,709,327 A | 11/1987 | Hillis et al. ................. 364/200 |
| 4,709,364 A | 11/1987 | Hasegawa et al. ........... 370/85 |
| 4,713,807 A | 12/1987 | Caves et al. .................. 370/94 |
| 4,746,920 A | 5/1988 | Nellen et al. .......... 340/825.04 |
| 4,747,130 A | 5/1988 | Ho ............................. 379/269 |
| 4,754,395 A | 6/1988 | Weisshaar et al. .......... 364/200 |
| 4,771,423 A | 9/1988 | Ohya et al. .................... 370/86 |
| 4,773,038 A | 9/1988 | Hillis et al. ................. 364/900 |
| 4,791,641 A | 12/1988 | Hillis .......................... 371/38 |
| 4,805,091 A | 2/1989 | Thiel et al. ................. 364/200 |
| 4,805,167 A | 2/1989 | Leslie et al. ................. 370/84 |
| 4,809,202 A | 2/1989 | Wolfram ..................... 364/578 |
| 4,814,762 A | 3/1989 | Franaszek ............... 340/825.79 |
| 4,815,110 A | 3/1989 | Benson et al. ............... 375/107 |
| 4,833,468 A | 5/1989 | Larson et al. ............. 340/825.8 |
| 4,864,559 A | 9/1989 | Perlman ...................... 370/60 |
| 4,870,568 A | 9/1989 | Kahle et al. ................. 364/200 |
| 4,922,418 A | 5/1990 | Dolecek ..................... 364/200 |
| 4,922,486 A | 5/1990 | Lidinsky et al. .............. 370/60 |
| 4,926,446 A | 5/1990 | Grover et al. ............... 375/109 |
| 4,930,121 A | 5/1990 | Shiobara ................... 370/85.4 |
| 4,949,239 A | 8/1990 | Gillett, Jr. et al. .......... 364/200 |
| 4,954,988 A | 9/1990 | Robb .................... 365/189.02 |
| 4,965,717 A | 10/1990 | Cutts, Jr. et al. |
| 4,993,028 A | 2/1991 | Hillis ........................ 371/39.1 |
| 5,014,265 A | 5/1991 | Hahne et al. |
| 5,018,137 A | 5/1991 | Backes et al. ........... 370/85.13 |
| 5,027,350 A | 6/1991 | Marshall ................ 370/85.13 |
| 5,067,078 A | 11/1991 | Talgam et al. ............... 395/400 |
| 5,070,446 A | 12/1991 | Salem ........................ 395/500 |
| 5,088,032 A | 2/1992 | Bosack ....................... 395/200 |
| 5,093,801 A | 3/1992 | White et al. ................ 364/726 |
| 5,111,198 A | 5/1992 | Kuszmaul .............. 340/825.52 |
| 5,113,510 A | 5/1992 | Hillis ......................... 395/425 |
| 5,117,420 A | 5/1992 | Hillis et al. .................... 370/60 |
| 5,124,981 A | 6/1992 | Golding |
| 5,129,077 A | 7/1992 | Hillis ......................... 395/500 |
| 5,148,547 A | 9/1992 | Kahle et al. ................. 395/800 |
| 5,151,996 A | 9/1992 | Hillis ......................... 395/800 |
| 5,157,663 A | 10/1992 | Major et al. ................. 371/9.1 |
| 5,163,149 A | 11/1992 | Brantley, Jr. et al. |
| 5,175,852 A | * 12/1992 | Johnson et al. ................. 707/8 |
| 5,175,865 A | 12/1992 | Hillis ......................... 395/800 |
| 5,212,773 A | 5/1993 | Hillis ......................... 395/200 |
| 5,222,216 A | 6/1993 | Parish et al. ................ 395/275 |
| 5,222,237 A | 6/1993 | Hillis ......................... 395/650 |
| 5,224,099 A | 6/1993 | Corbalis et al. |
| 5,247,613 A | 9/1993 | Bromley ..................... 395/200 |
| 5,247,694 A | 9/1993 | Dahl ......................... 395/800 |
| 5,255,291 A | 10/1993 | Holden et al. ............... 375/111 |
| 5,261,105 A | 11/1993 | Potter et al. ................. 395/725 |
| 5,265,207 A | 11/1993 | Zak et al. ................... 395/200 |
| 5,274,631 A | 12/1993 | Bhardwaj .................... 370/60 |
| 5,280,470 A | 1/1994 | Buhrke et al. |
| 5,289,156 A | 2/1994 | Ganmukhi ............... 340/146.2 |
| 5,295,258 A | 3/1994 | Jewett et al. ................ 395/575 |
| 5,301,310 A | 4/1994 | Isman et al. ................. 395/575 |
| 5,317,726 A | 5/1994 | Horst ......................... 395/575 |
| 5,325,487 A | 6/1994 | Au et al. ..................... 395/250 |
| 5,331,637 A | 7/1994 | Francis et al. ................ 370/54 |
| 5,349,680 A | 9/1994 | Fukuoka ..................... 395/800 |
| 5,353,283 A | 10/1994 | Tsuchiya ..................... 370/60 |
| 5,355,492 A | 10/1994 | Frankel et al. ............... 395/700 |
| 5,357,612 A | 10/1994 | Alaiwan ..................... 395/200 |
| 5,359,592 A | 10/1994 | Corbalis et al. |
| 5,361,256 A | 11/1994 | Doeringer et al. ............. 370/60 |
| 5,361,363 A | 11/1994 | Wells et al. ................. 395/800 |
| 5,367,692 A | 11/1994 | Edelman ..................... 395/800 |
| 5,388,214 A | 2/1995 | Leiserson et al. ............ 395/200 |
| 5,388,262 A | 2/1995 | Hillis ......................... 395/650 |
| 5,390,298 A | 2/1995 | Kuszmaul et al. ............ 395/200 |
| 5,394,402 A | 2/1995 | Ross ........................ 370/94.1 |
| 5,404,296 A | 4/1995 | Moorhead ................... 364/421 |
| 5,404,562 A | 4/1995 | Heller et al. ................. 395/800 |
| 5,410,723 A | 4/1995 | Schmidt et al. .............. 395/800 |
| 5,414,704 A | 5/1995 | Spinney ....................... 370/60 |
| 5,428,761 A | 6/1995 | Herlihy et al. ............... 395/425 |
| 5,440,752 A | 8/1995 | Lentz et al. ................. 395/800 |
| 5,442,633 A | 8/1995 | Perkins et al. .............. 370/94.1 |
| 5,455,932 A | 10/1995 | Major et al. ................. 395/489 |
| 5,473,607 A | 12/1995 | Hausman et al. ......... 370/85.13 |
| 5,475,856 A | 12/1995 | Kogge ........................ 395/800 |
| 5,485,627 A | 1/1996 | Hillis ......................... 395/800 |
| 5,499,384 A | 3/1996 | Lentz et al. ................. 395/821 |
| 5,500,860 A | 3/1996 | Perlman et al. ........... 370/85.13 |
| 5,511,168 A | 4/1996 | Perlman et al. ......... 395/200.15 |
| 5,530,809 A | 6/1996 | Douglas et al. ............ 395/200.2 |
| 5,535,408 A | 7/1996 | Hillis ......................... 395/800 |
| 5,561,669 A | 10/1996 | Lenney et al. .............. 370/60.1 |
| 5,566,170 A | 10/1996 | Bakke et al. .................. 370/60 |
| 5,568,380 A | 10/1996 | Brodnax et al. ............. 364/184 |
| 5,583,996 A | 12/1996 | Tsuchiya ................. 395/200.15 |
| 5,600,644 A | 2/1997 | Chang et al. ................ 370/404 |
| 5,612,959 A | 3/1997 | Takase et al. ................ 370/390 |
| 5,613,136 A | 3/1997 | Casavant et al. ............. 395/800 |
| 5,613,139 A | * 3/1997 | Brady ......................... 710/200 |
| 5,617,421 A | 4/1997 | Chin et al. ................... 370/402 |
| 5,617,538 A | 4/1997 | Heller ..................... 395/200.02 |
| 5,621,885 A | 4/1997 | Del Vigna, Jr. ......... 395/182.11 |
| 5,627,965 A | 5/1997 | Liddell et al. ............ 395/185.01 |
| 5,633,858 A | 5/1997 | Chang et al. ................ 370/255 |
| 5,633,866 A | 5/1997 | Callon ........................ 370/397 |
| 5,673,423 A | 9/1997 | Hillis ......................... 395/553 |
| 5,684,800 A | 11/1997 | Dobbins et al. ............. 370/401 |
| 5,710,814 A | 1/1998 | Klemba et al. ................. 380/9 |
| 5,734,909 A | * 3/1998 | Bennett ....................... 710/200 |
| 5,740,171 A | 4/1998 | Mazzola et al. ............. 370/392 |
| 5,742,604 A | 4/1998 | Edsall et al. ................. 370/401 |
| 5,748,936 A | 5/1998 | Karp et al. ................... 395/394 |
| 5,748,963 A | 5/1998 | Orr |
| 5,751,955 A | 5/1998 | Sonnier et al. ......... 395/200.19 |
| 5,761,659 A | * 6/1998 | Bertoni ........................ 707/8 |
| 5,764,636 A | 6/1998 | Edsall ........................ 370/401 |
| 5,781,715 A | 7/1998 | Sheu ...................... 395/182.02 |
| 5,781,753 A | 7/1998 | McFarland et al. .......... 395/394 |
| 5,787,243 A | 7/1998 | Stiffler .................... 395/182.11 |
| 5,787,255 A | 7/1998 | Parlan et al. ............. 395/200.63 |
| 5,796,732 A | 8/1998 | Mazzola et al. |
| 5,796,740 A | 8/1998 | Perlman et al. ............. 370/401 |
| 5,812,811 A | 9/1998 | Dubey et al. ................. 395/392 |
| 5,818,842 A | 10/1998 | Burwell et al. .............. 370/397 |
| 5,828,844 A | 10/1998 | Civanlar et al. ......... 395/200.58 |
| 5,832,291 A | 11/1998 | Rosen et al. ........... 395/800.11 |
| 5,838,915 A | 11/1998 | Klausmeier et al. ... 395/200.45 |
| 5,852,607 A | 12/1998 | Chin ......................... 370/401 |
| 5,860,086 A | 1/1999 | Crump et al. ............... 711/109 |
| 5,872,963 A | 2/1999 | Bitar et al. .................. 395/580 |

| | | | |
|---|---|---|---|
| 5,898,686 A | | 4/1999 | Virgile .................... 370/381 |
| 5,909,441 A | | 6/1999 | Alexander, Jr. et al. .... 370/395 |
| 5,909,550 A | | 6/1999 | Shankar et al. ........ 395/200.57 |
| 5,941,988 A | | 8/1999 | Bhagwat et al. ............ 713/201 |
| 5,953,512 A | | 9/1999 | Cai et al. .................... 395/381 |
| 5,956,712 A | * | 9/1999 | Bennett et al. ................ 707/8 |
| 5,960,211 A | | 9/1999 | Schwartz et al. ...... 395/800.22 |
| 5,968,157 A | * | 10/1999 | Joy et al. .................... 710/200 |
| 5,983,329 A | * | 11/1999 | Thaler et al. ............... 711/163 |
| 6,026,464 A | | 2/2000 | Cohen |
| 6,035,422 A | | 3/2000 | Hohl et al. .................... 714/35 |
| 6,067,569 A | | 5/2000 | Khaki et al. ................ 709/224 |
| 6,101,569 A | * | 8/2000 | Miyamoto et al. .......... 710/200 |
| 6,105,085 A | * | 8/2000 | Farley ......................... 710/41 |
| 6,119,215 A | | 9/2000 | Key et al. |
| 6,163,855 A | * | 12/2000 | Shrivastava et al. ........... 714/4 |
| 6,173,386 B1 | | 1/2001 | Key et al. |
| 6,195,739 B1 | | 2/2001 | Wright et al. |

OTHER PUBLICATIONS

*IEEE Standard Project P802.IQ,Draft Standard for Virtual Bridged Local Area Networks,* Copyright by the Institute of Electrical and Electronics Engineers, Inc.,Feb. 28, 1997, pp. 1–88.

*Draft Standard P. 802.IQ/D10, IEEE Standards for Local and Metropolitan Area Networks: Virtual Bridged Local Area Networks,* Copyright by the Institute of Electrical and Electronics Engineers, Inc., Mar. 22, 1997, pp. 1–212.

*ISL Configurations for Cisco IOS and the Catalyst 5000,* web, http://www.cisco.com/warp/public/741/8.html, pp. 1–8.

*Dynamic Inter–Switch Link Protocol,* 2.2 Configuration Note, pp. 2–6.

*Virtual LANs,* Catalyst 2820 Series and Catalyst 1900 Series Enterprise Edition Software Configuration Guide, Chapter 2, pp. 2–1–2–49.

*Configuring VTP and Virtual LANs,* Catalyst 5000 Series Software Configuration Guide, Chapter 13, pp. 13–1–13–24.

IEEE 1149.1 Device Architecture, http://www.asset–intertech.com/homepage/bscantutr/arch.htm, pp. 1–3, 1998.

IEEE 1149.1 Device Architecture (continued), Using the Instruction Register (IR), http://www.asset–intertech.com/homepage/bscantutr/arch2.htm#Using IR, pp. 1–4, 1998.

The Principle of Boundary–Scan Architecture, http://www.asset–intertech.com/homepage/bscantutr/principl.htm, pp. 1–4, 1998.

IEEE 1149.1 Device Architecture (continued), The Test Access Port (TAP), http://www.asset.intertech.com/homepage/bscantutr/arch3.htm#TAP, pp. 1–3, 1998.

Digital Systems Testing and Testable Design, Miron Abramovici, et al., Computer Science Press, pp. 342–409, Copyright 1990.

World Wide Web page http://www.synopsys.com/products/analysis/primtime_ds.html, *Prime Time,* Jul. 12, 1999, pp. 1–7.

World Wide Web page http://www.synopsys.com/products/analysis/primtime_cs.html, *Prime Time: Full–Chip, Gate–Level Static Timing Analysis,* Jul. 12, 1999, pp. 1–2.

World Wide Web page http://www.synopsys.com/products/analysis/sta_wp.html, *Static Timing Verification: Methodology Overview,* Jul. 12, 1999, pp. 1–13.

World Wide Web page http://www.synopsys.com/products/analysis/pt_tech_bgr.html, *Prime Time Full–Chip Static Timing Analyzer,* Jul. 12, 1999, pp. 1–17.

Pankaj Gupta and Nick McKeown, Packet Classification on Multiple Fields.

Dawson R. Engler and M. Frans Kaashoek, DPF: Fast, Flexible Message Demultiplexing using Dynamic Code Generation, 1996, pp. 53–59.

T.V. Lakshman and D. Stiliadis, High–Speed Policy–based Packet Forwarding Using Efficient Multi–dimensional Range Matching, 1998, pp. 203–214.

Computer Architecture *The Anatomy of Modern Processors,* Pipeline Hazards, world wide web page http://clips.ee.uwa.edu.au/~morris/CA406/pipe_hazard.html, 1999, pp. 1–6.

U.S. patent application Ser. No. 09/106,478, Kerr et al., filed Jun. 29, 1998.

* cited by examiner

GROUP AND VIRTUAL LOCKING MECHANISM FOR INTER PROCESSOR SYNCHRONIZATION

RELATED APPLICATIONS

This Application is a Continuation of U.S. patent application Ser. No. 09/432,464 Filed Nov. 3, 1999, now issued as U.S. Pat. No. 6,529,983 on Mar. 4, 2003.

FIELD OF THE INVENTION

The present invention relates generally to computer architecture and, more particularly, to processor synchronization within a programmable arrayed processing engine.

BACKGROUND OF THE INVENTION

Computer architecture generally defines the functional operation, including the flow of information and control, among individual hardware units of a computer. One such hardware unit is a processing engine that contains arithmetic and logic processing circuits organized as a set of data paths. In some implementations, the data path circuits may be configured as a processor having a register file of general-purpose registers for use with operations that are defined by a set of instructions. The instructions are typically stored in an instruction memory and specify a set of hardware functions that are available on the processor. When implementing these functions, the processor generally processes "transient" data residing in a memory in accordance with the instructions.

A high-performance processing engine configured for use in, e.g., an intermediate network device may be realized by using a number of identical processors to perform certain tasks in parallel. For a parallel multiprocessor architecture, each processor may have shared access to information stored in a common resource, such as a memory. Processor synchronization denotes serialization of access to the shared resource. In a multiprocessor environment, processors that share data stored in the memory resource typically access that resource serially, rather than in parallel, in accordance with a processor synchronization mechanism to ensure that the data does not change from its expected state.

There are multiple mechanisms used for processor synchronization, most of which are based on the use of semaphores. A semaphore is a variable, such as a hardware or software flag, with a value that indicates the status of a common resource. To keep processors from interfering with one another, the semaphore may be used to lock the resource. In this context, the lock is an abstraction that represents permission to access the resource and, to that end, may be further viewed as a memory bit associated with the resource. If the bit is not asserted ("0"), the lock is free and if the bit is asserted ("1"), the lock is busy.

Lock (and unlock) requests are typically atomic in that they are implemented such that neither an interrupt nor a multiprocessor access affects the outcome. All processors that access a shared resource must obtain a lock that corresponds to that resource before manipulating its contents. A processor requesting the resource checks the lock to determine the resource's status and then decides how to proceed. If the lock is already held by another processor, the requesting processor must defer its access until the lock becomes available.

For example, a hardware semaphore and a group of synchronization variables may be used to simultaneously request locking of multiple exclusive resources to avoid, e.g., a deadlock situation. A known implementation for achieving this function involves initially obtaining a lock that is used to guard the set of resource variables and then interrogating those variables. If the resources are available, the variables are marked as being in-use and lock is granted; otherwise, none of the variables are updated and the lock is released. A typical software approach to locking a shared resource involves disabling all interrupts and invoking an atomic sequence, such as setting a flag and reading the state of that flag (i.e., a "test-and-set" operation).

SUMMARY OF THE INVENTION

The present invention relates to a group and virtual locking mechanism (GVLM) that addresses two classes of synchronization present in a system having resources that are shared by a plurality of processors: (1) synchronization of the multi-access shared resources; and (2) simultaneous requests for the shared resources. In the illustrative embodiment, the system is a programmable processing engine comprising an array of processor complex elements, each having a microcontroller (TMC) processor. The processor complexes are preferably arrayed as rows and columns. Broadly stated, the novel GVLM comprises a lock controller function associated with each column of processor complexes in cooperating relation with lock instructions executed by the TMC processors to thereby create a tightly integrated arrangement for generating lock requests directed to the shared resources.

Specifically, the GLVM merges a lock request and group information into a single instruction to reduce the time needed to obtain a group of locks. The lock request is then communicated to the lock controller. Notably, lock state variables used by the present invention reside in the lock controller as opposed to an external memory. This feature of the invention extends usable memory bandwidth by not requiring memory access cycles to obtain a lock and, further, significantly reduces latency associated with acquiring the lock.

In an aspect of the invention, a virtual semaphore mechanism is provided that allows multiple processors to access a shared resource, such as memory. Multiple processors can access the shared resource as long as each processor is accessing a different region of the resource. Therefore, the shared resource is partitioned into variable size regions and, according to the invention, each region is assigned a virtual sempahore identifier for use with the GVLM. The virtual identifier enables locking of a portion of the resource, rather than the entire resource. This, in turn, allows a plurality of processors to simultaneously access the shared resource, thereby increasing performance of the system.

According to the invention, the TMC instruction set provides a get virtual semaphore, xgvs, instruction that allows a processor to obtain a virtual lock. One virtual lock may be "owned" per processor, per group. However, the lock controller allows multiple locks to exist within one resource group as long as another processor does not own the virtual identifier and the entire group has not been locked via, e.g., a get binary semaphore, xgbs, instruction. All locks are cleared via a xcs instruction. In another aspect of the invention, a single processor may request locking of multiple shared resources (functions) at the same time by issuing either the xgbs or xgvs instruction and simultaneously specifying two functions to be locked. By allowing the instruction to specify a group of resources at the same time deadlock situations can be avoided.

Advantageously, the GVLM provides an efficient means to obtain locks for multiple exclusive resources or shared multi-access resources. The invention also enhances inter-processor synchronization for tightly coupled processors. he GVLM invention is efficient in terms of lock acquisition and release times, and also requires less memory bandwidth as compared to prior implementations.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
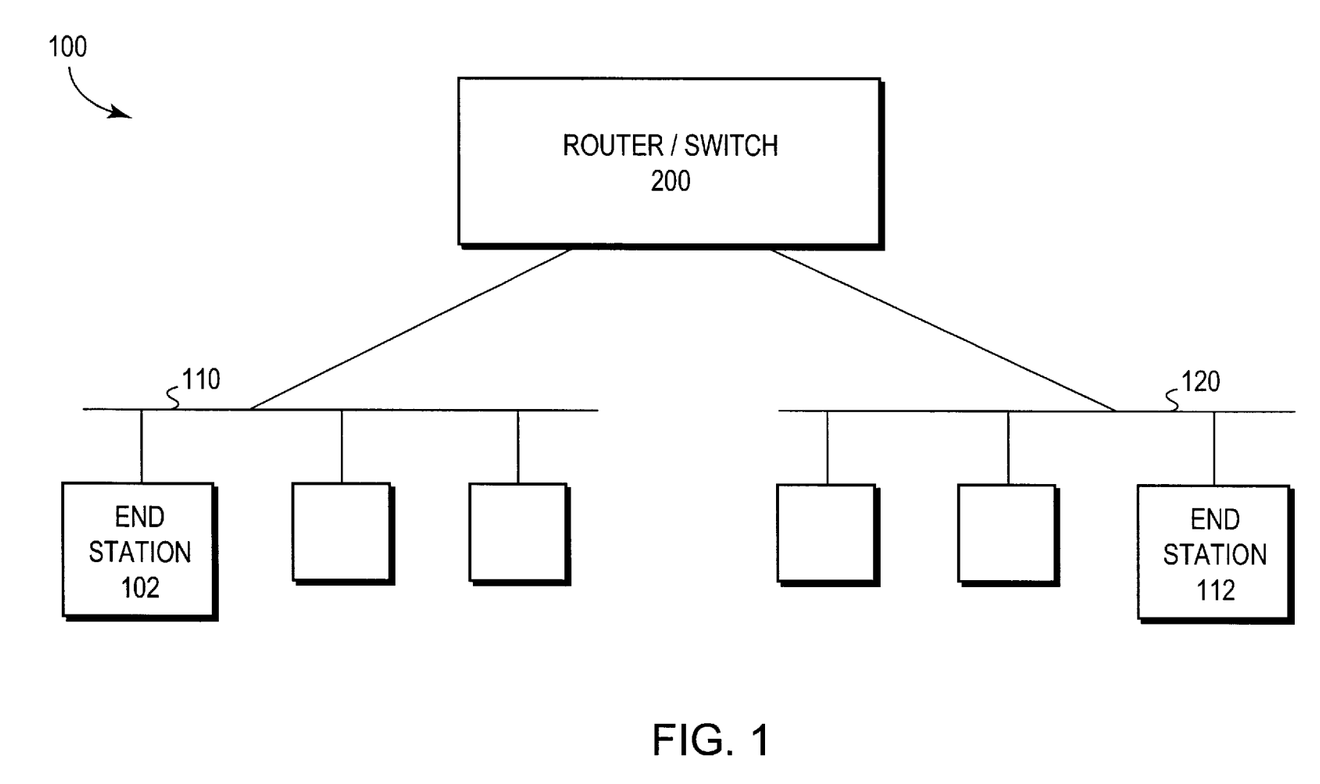
FIG. 1 is a block diagram of a computer network comprising a collection of inter-connected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
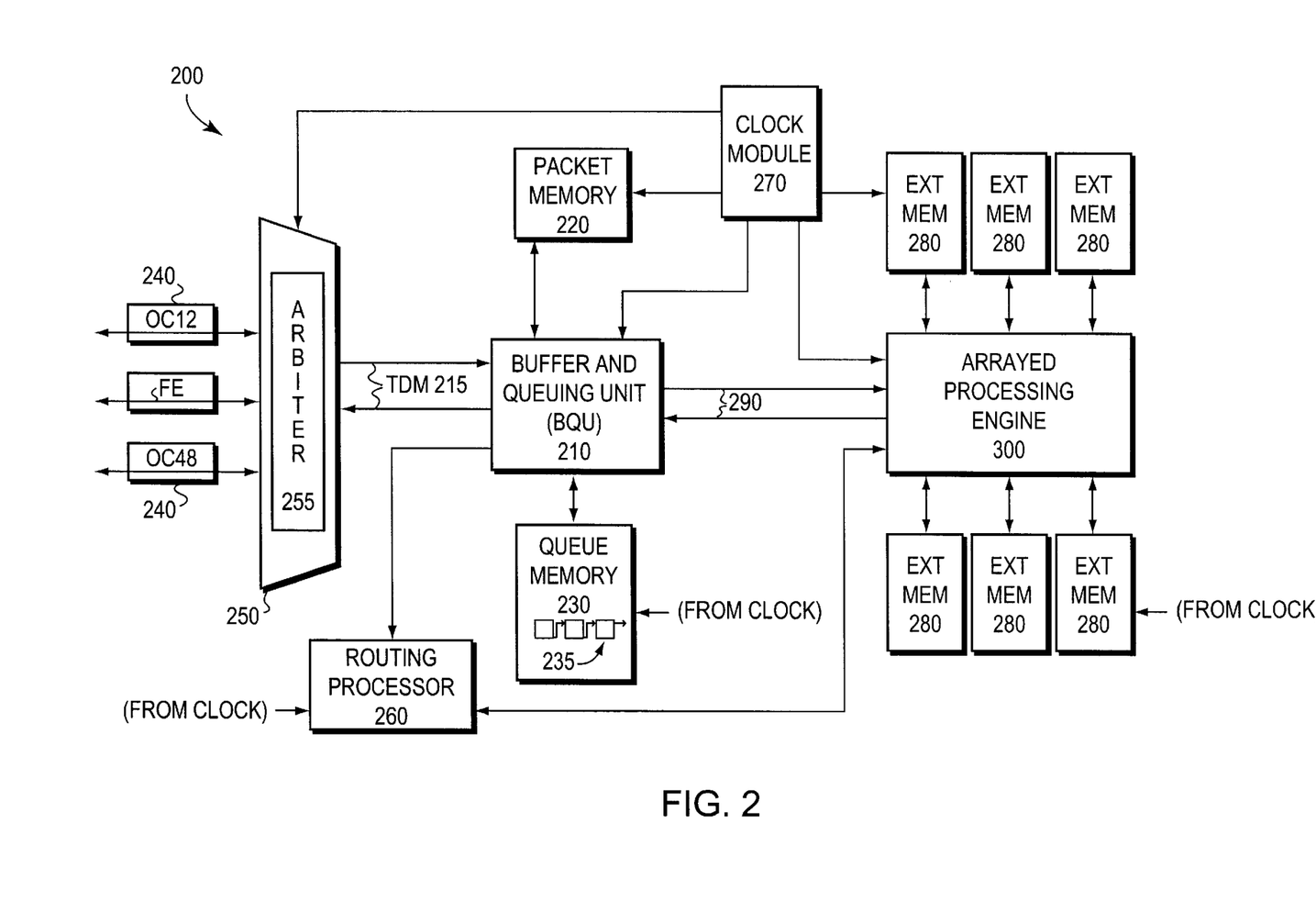
FIG. 2 is a schematic block diagram of intermediate station, such as a network switch, that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. To that end, operation of the switch will be described with respect to IP switching of packets, although the switch may be programmed for other applications, such as data encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many input/output channels on these interfaces, each of which is associated with at least one queue 235 in the queue memory 230. The processing engine 300 generally functions as a switching processor that modifies packets and/or headers in sequence as the BQU 210 implements queuing operations.

A routing processor 260 executes conventional routing protocols for communication directly with the processing engine 300. The routing protocols generally comprise topological information exchanges between intermediate stations to determine optimal paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
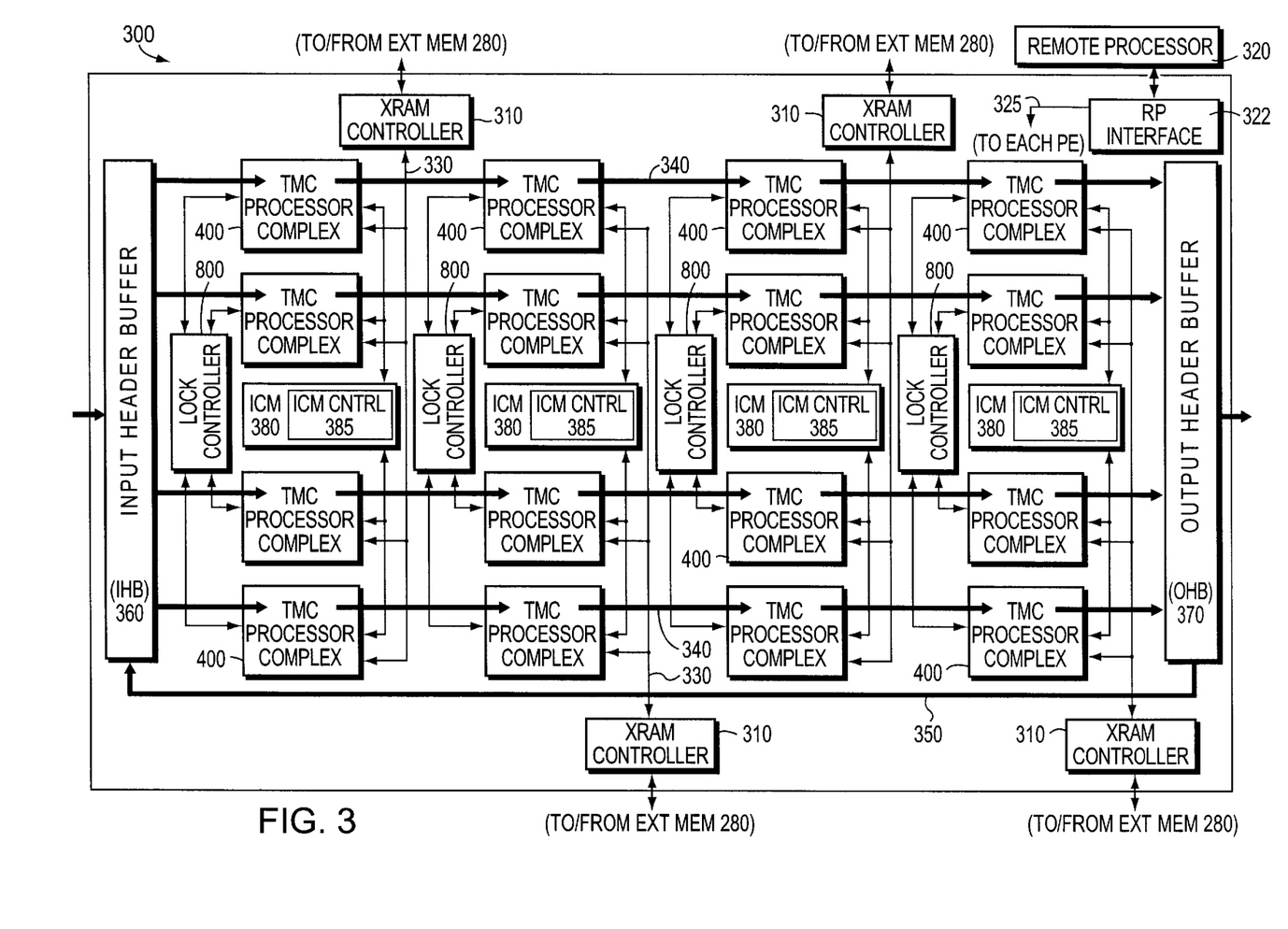
FIG. 3 is a schematic block diagram of a programmable arrayed processing engine having a plurality of processor complex elements arrayed as columns and pipeline rows.

FIG. 3 is a schematic block diagram of the programmable processing engine 300 which generally comprises an array of processing elements embedded between input and output header buffers with a plurality of interfaces 310 from the array to partitions of an external memory. The external memory stores non-transient data organized within data structures for use in processing the transient data. The non-transient data typically includes "table" data contained in forwarding and routing tables, statistics, access filters, encryption keys and/or queuing information. Transient data enters and exits the engine via 100 MHz 64-bit input and output data interfaces of the BQU 210. As described further herein, remote processor interface (I/F) 322 provides information, such as instructions and data, from a remote processor (RP) 320 to the PEs and header buffers over a 32-bit maintenance bus 325 having multiplexed address/data lines.

The processing engine 300 comprises a plurality of processing elements (PE) 400 is arrayed into multiple rows and columns; in the illustrative embodiment, the PEs are arrayed as four (4) rows and four (4) columns in a 4×4 arrayed configuration that is embedded between an input header buffer (IHB) 360 and an output header buffer (OHB) 370. However it should be noted that other configurations, such as a 6×6 arrayed configuration or similar rectangularly arrayed configurations, may be advantageously used with the present invention. A 64-bit feedback path 350 couples the OHB 370 to the IHB 360 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next.

Specifically, the processing elements of each row are configured as stages of a pipeline that sequentially execute operations on the transient data loaded by the IHB 360, whereas the processing elements of each column operate in parallel to perform substantially the same operation on the transient data, but with a shifted phase. An example of an arrayed processing engine and network switch suitable for use with the present invention is described in and commonly-owned U.S. Pat. Ser. No. 09/106,478, filed Jun. 29, 1998 and titled Programmable Arrayed Processing Engine Architecture for a Network Switch.

Sequencing circuitry of the IHB 360 controls the processing element stages of each pipeline by ensuring that each stage completes processing of current transient data prior to loading new transient data into the pipeline stages at a new phase. In general, a new phase of processing is started, i.e., a context switch is performed, when all of the PE stages finish processing their current context and new, incoming context is completely received by the IHB. An example of a system for controlling phase processing that is suitable for use with the present invention is described in and commonly-owned U.S. patent application Ser. No. 09/106, 246 titled Synchronization and Control System for an Arrayed Processing Engine, which application is hereby incorporated by reference as though fully set forth herein.

Because they perform similar functions, the columned PEs require similar non-transient "table" data. Therefore, the external memory is partitioned into a plurality of external memory (Ext Mem) resources 280, each of which is dedicated to a respective column of PEs. A plurality of internal memories 380, each of which is also dedicated to a respective column of PEs, are also located on the processing engine 300. The Ext Mem 280 and internal column memory (ICM) 380 are configured with non-transient table data needed to support the similar function performed by the columned processor elements.

In the illustrative embodiment, there are preferably two shared resources for each column of PEs: the ICM 380 and the Ext Mem 280. Specifically, these shared resources include an ICM controller 385 coupled to the ICM 380 and an external memory (XRAM) controller 285 coupled to Ext Mem 280. The XRAM controller 310 is preferably embodied as a 200 MHz 32-bit external memory interface coupled to each column of PEs, whereas the ICM controller 385 is preferably contained in each ICM resource 380. The controllers are configured to enable columned processor access to the non-transient data stored in the external and internal column memories.

The present invention relates to a group and virtual locking mechanism (GVLM) that addresses two classes of synchronization present in a system having resources that are shared by a plurality of processors: (1) synchronization of the multi-access shared resources; and (2) simultaneous requests for the shared resources. To support efficient multi-processor synchronization, hardware semaphore operations are provided for each column of processors. This allows software to manage/lock the shared resources among the PEs of a column and the RP 320.

Figure 4:
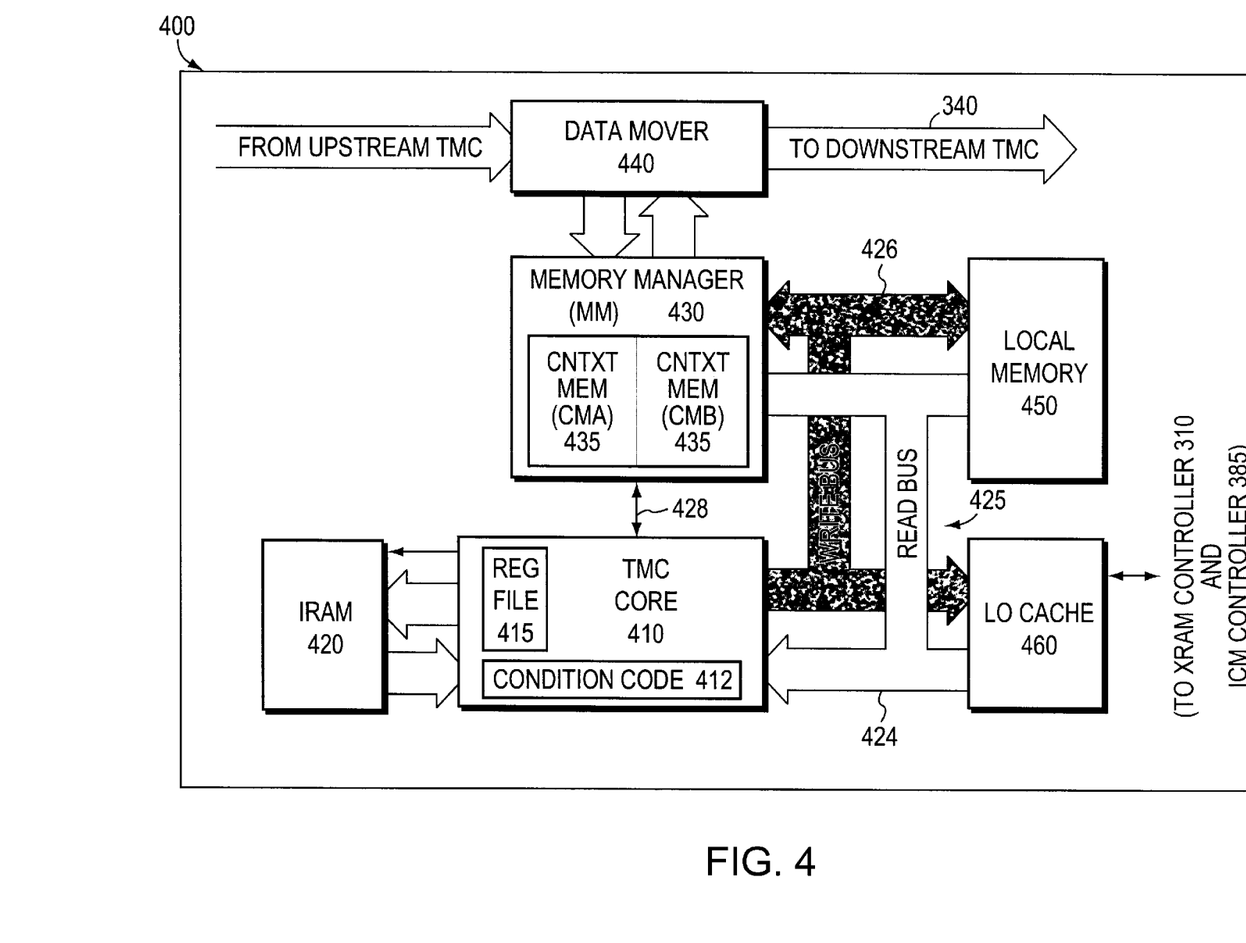
FIG. 4 is a schematic block diagram of a processor complex element including a microcontroller (TMC) processor for use with the present invention.

FIG. 4 is a schematic block diagram of a PE 400. The PE is a processor complex comprising a processor 410 coupled to an instruction memory (IRAM) 420 and a memory manager (MM) circuit 430. The IRAM 420 stores instructions for execution by the processor 410, which is preferably a customized, single-threaded microcontroller (TMC) core having a dense structure which enables implementation of similar cores on an application specific integrated circuit. The present invention may apply to any number of processors within a column and, in fact, to a single processor with multiple threads of execution, each of which attempts to access a single shared resource.

The TMC core 410 is preferably a pipelined processor that includes a plurality of arithmetic logic units (ALUs), a register file 415 having a plurality of 32-bit general purpose registers (GPRS) and an instruction fetch and decode unit organized as a set of data paths. The GPRs generally store intermediate result information processed by the ALUs, whereas the instruction fetch and decode unit decodes instructions fetched from the IRAM. The intermediate results are passed among PE stages 400 of the engine 300 over a consistent data path channel 340 provided by a data mover circuit 440 coupled to the MM 430.

A 64-bit local bus 425 (comprising a read bus portion 424 and a write bus portion 426) interconnects the TMC core with context memories 435, a local memory 450 and a level zero (L0) cache 460 coupled to the XRAM controller 310 and ICM controller 385. The L0 cache 460 may be a fully associative, multiport data cache that services external memory 280 and the ICM 380 that are shared among the PEs of a column. The L0 cache provides various caching and buffering functions for those memories, and may further issue specific memory primitives to the appropriate controller of either the external memory or ICM to thereby increase the overall bandwidth and efficiency of the TMC 410.

Each context memory 435 stores transient "context" data (e.g., packet/frame data) flowing through the PE 400 that is unique to a specific process, whereas the local memory 450 is generally configured to store, inter alia, pointers that reference data structures and tables stored in external memory 280 and ICM 380 for use by the TMC core 410. One context memory (CMA) is associated with a phase A context and the other memory (CMB) is associated with a phase B context. During a current pipeline phase, the TMC accesses data from its current context, which may be alternately stored in CMA and CMB. Any modification of context data is written to the current context memory as well as to the downstream complex's next context memory (e.g., current context memory CMA and downstream context memory CMB). Management of the context sensitive memory is provided by the MM 430, which comprises data path and control logic for cooperating with the data mover 440 and context memories 435 to efficiently pass data among the PE stages of the processing engine.

In the illustrative embodiment, the shared memory resources 280, 380 accessed by the TMC processors may further comprise entries of relatively large data structures of the shared memories. These data structures, e.g., tables, are constantly updated and accessed by the processors of each column. An example of such a table structure is an IP address-to-interface translation table located in the ICM 380. As the processing engine "learns" new IP addresses, those addresses are loaded into the table and frequently accessed by the processors. Multiple processors can access the shared resource as long as each processor is accessing a different region of the resource. The present invention is generally directed to a mechanism that enables multiple processors to simultaneously access the table and operate on its contents.

Specifically, the large tables may be apportioned into smaller subareas so that the probability of multiple processors accessing the same location of a subarea at the same time is low. For example, assume that the table contains 4,000 entries, wherein each entry is associated with a channel or I/O port over which frames may be transmitted and received through the switch. The table may thus be logically divided into 4,000 areas. A single semaphore bit used to lock the entire table would be inefficient since the processors are constantly accessing the table for purposes of transmitting/queuing frames through the switch. The present invention is further directed to a mechanism that quickly identifies whether the subarea or region accessed by a processor is currently locked.

Figure 5:
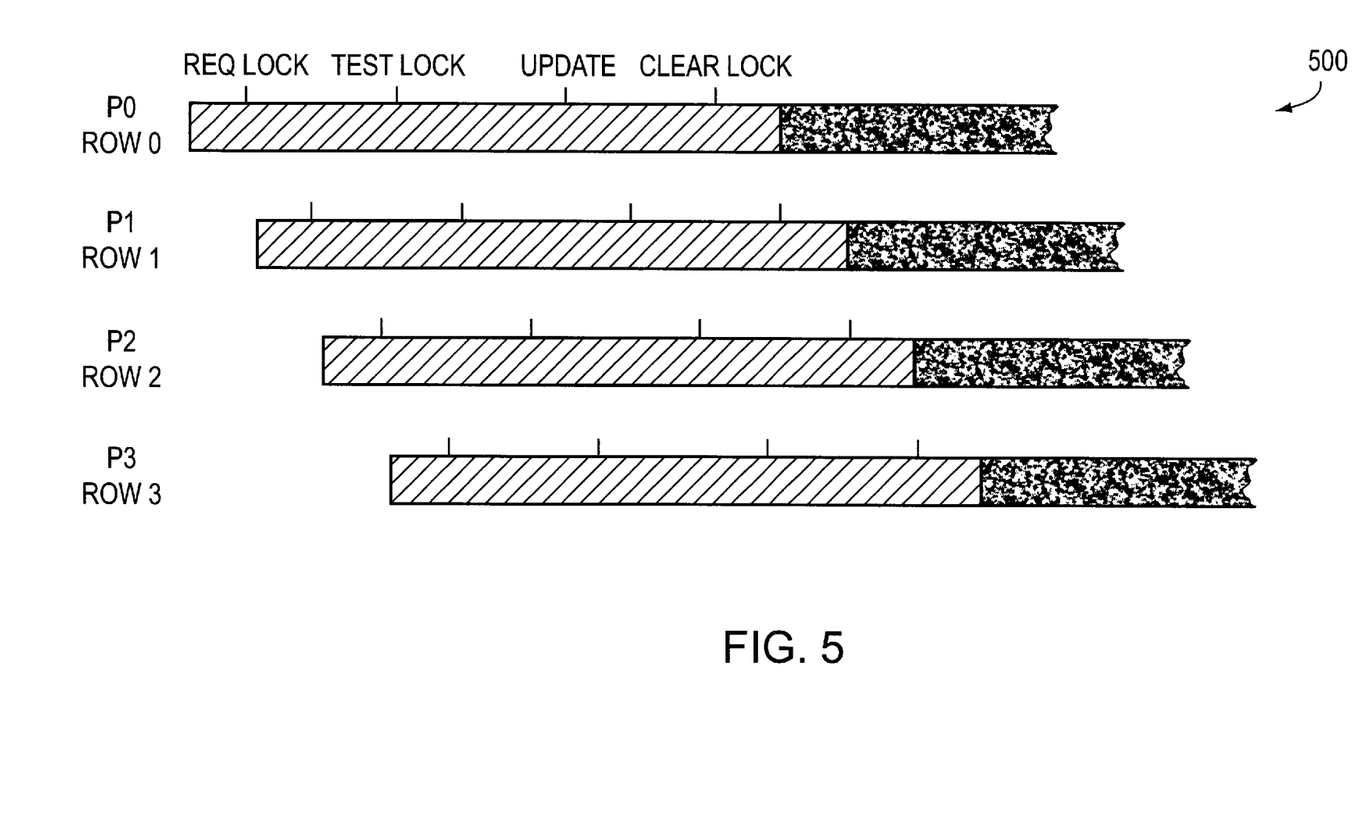
FIG. 5 is a timing diagram depicting processing of data in each pipeline row of the processing engine in FIG. 3.

In addition, memory latency is significant with respect to the amount of time each processor is processing information. As previously noted, the processors of each column operate in parallel to perform substantially the same operation on the data passing through their PEs, but with a shifted phase. The memory latency of the TMC architecture results in overlap between the processors of a column despite the phase shift. FIG. 5 is a timing diagram 500 that depicts processing of transient data in each pipeline row of PE stages. Each line represents a pipelined row of PE stages wherein the cross-hatched portion of each line represents processing performed on a first packet loaded into each row. Once processing is finished on those packets, the solid line represents processing performed on a subsequent packet loaded into each row. As can be seen, packet processing and completion (along with the initiation of subsequent packet processing) are staggered in time.

Specifically, processor P0 in row R0 of a particular column may be updating the table during its phase of execution. As part of the update process, the processor may read a table location at the beginning of its execution phase and then wait a substantially long period of time before data is returned. Later near the end of the execution phase, it performs a write operation to update the table location. Because of the relatively high memory latency, P1 in R1 of that column may be accessing the table for purposes of updating a location simultaneously with the pending update operation of the P0. For an implementation having a single semaphore that locks the entire table, as many as three of the four processors in the column can be stalled during the update process of P0. Stalling of processors results in adverse performance and accompanying inefficiencies in the processing engine.

According to the invention, a virtual semaphore mechanism is provided that allows multiple processors to simultaneously access the shared memory resource. As noted, the shared resource is partitioned into variable size regions and, according to the invention, each region is assigned a virtual semaphore identifier for use with the GVLM. This virtual identifier enables locking of a portion of the resource, rather than the entire resource. By apportioning the table into the finest granularity possible, the processors are allowed to operate independently and simultaneously on various locations therein to improve the performance of the processing engine since the probability of two processors accessing the same location at the same time is low.

Figure 8:
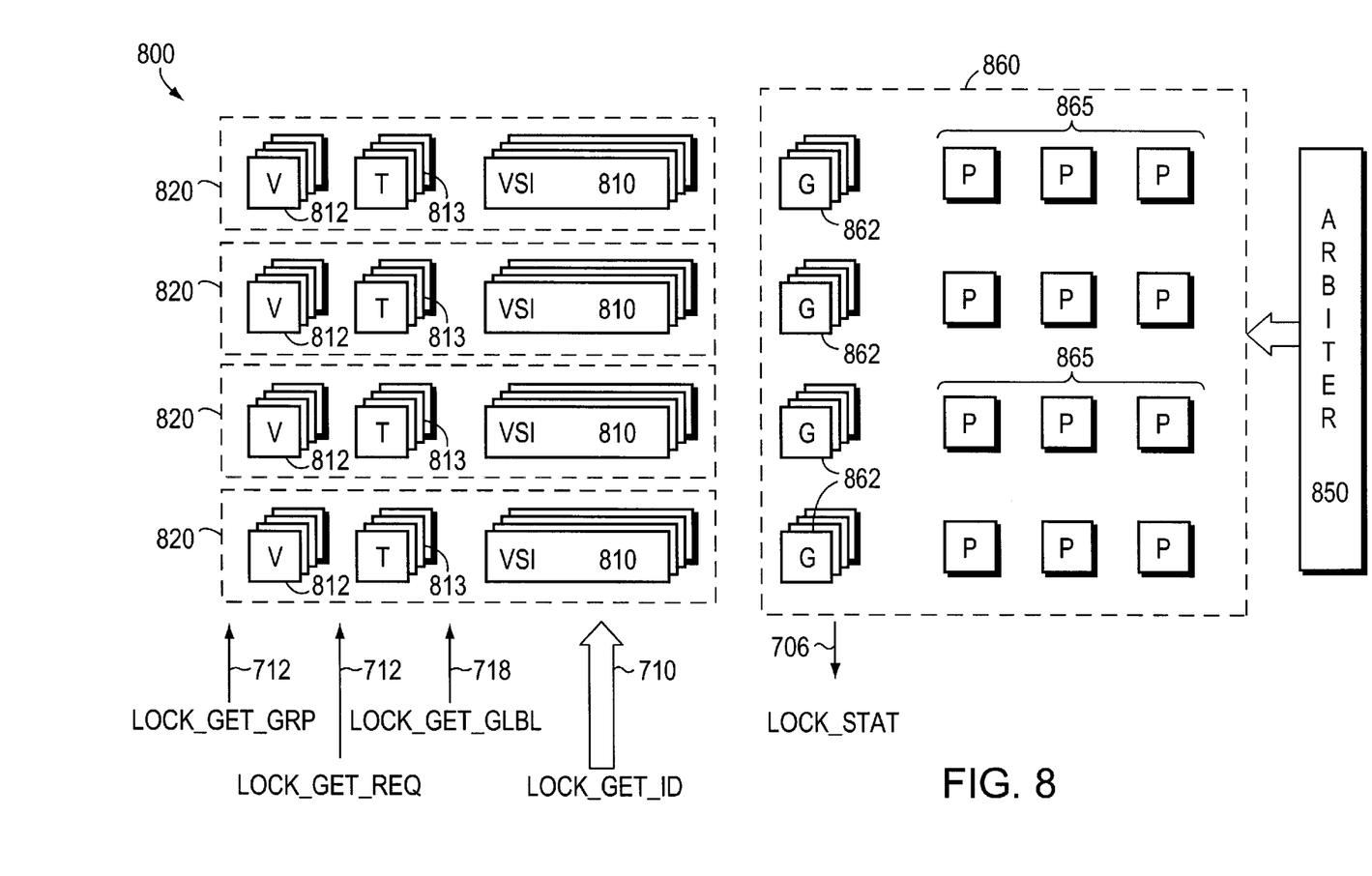
FIG. 8 is a highly schematic block diagram of the lock controller in accordance with the present invention.

Broadly stated, the novel GVLM comprises a lock controller function 800 associated with each column of processor complexes in cooperating relation with lock instructions executed by the TMC processors 410. That is, the executed lock instructions manipulate the lock controller 800 to create a tightly integrated arrangement for generating lock requests directed to the shared resources. Each TMC processor may perform the following functions during a 64 processor cycle execution phase: issue a lock request, test the lock and then execute a function (e.g., an update) before clearing the lock. According to the invention, the processor issues a virtual semaphore identifier as part of the lock request, wherein the identifier specifies a region of the shared resource for access by the processor. In the illustrative embodiment, the virtual identifier is a 12-bit value that enables an addressing granularity of 4,096 locations in a shared resource. Notably, the 12-bit identifier value associated with the lock request and corresponding to the granularity of the shared resource is completely under software control and may, of course, assume other configurations according to the invention.

A processor that issues a lock request for a particular area may not lock another area of the shared resource until it has cleared the previous lock. According to the GVLM arrangement, each processor may concurrently issue four independent lock requests, wherein each request is directed to a separate shared resource. In particular, there are 4 semaphore groups per column in the illustrative embodiment of the invention and each processor can issue 4 semaphore requests (one per group).

Figure 6:
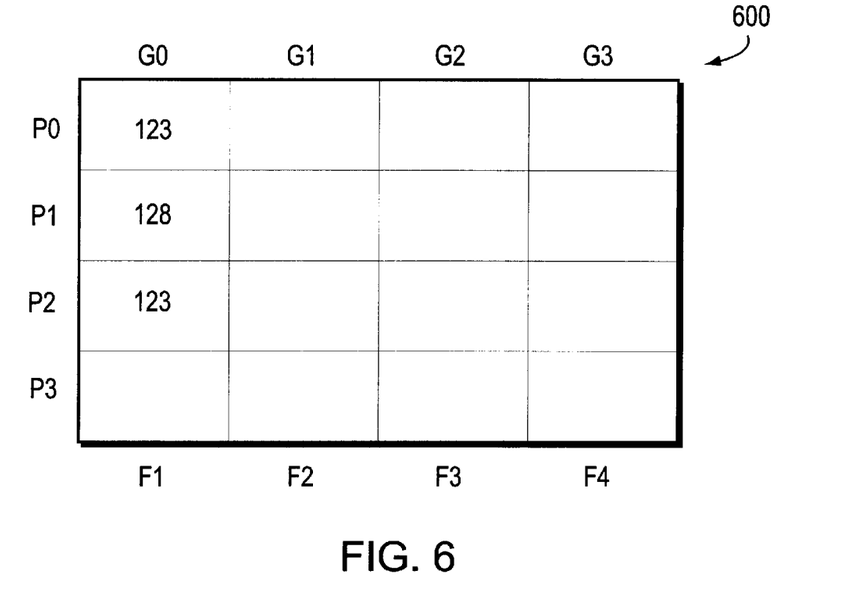
FIG. 6 is a schematic diagram of a lock control data structure that may be advantageously used with the present invention.

FIG. 6 is a schematic diagram of a lock control data structure 600 residing within each lock controller. The data structure (i.e., a table) depicts various groups G0–G3 that may be locked by each processor P0–P3 of a column. Each lock is associated with a particular function F1–F4 wherein each function is associated with a shared resource. For example, F1 may be associated with the ICM 380 and F2 may be associated with the Ext Mem 280. As described further herein, a processor can lock a particular location in the first function (ICM) and, simultaneously, can lock a location in a second function (Ext Mem). The functions may further represent individual data structures within, e.g., ICM. In that case, F1 may be associated with the IP address-to-interface translation table, while F2 could be associated with another table in the ICM.

Assume processor P0 issues a lock request to lock a particular region of ICM. The lock request specifies the group and the virtual semaphore identifier corresponding to the region to be locked (e.g. G0, number 123). Simultaneously, P1 issues a lock request to lock the following region (G0, number 128). In this case the lock controller will grant both requests since they are non-competing requests (even though the same group is being addressed by the processors, they are seeking to lock different areas within a shared resource). If however P2 issues a lock request to lock area 123 in Group 0 (G0, number 123), then a conflict arises since both P0 and P2 are vying for the same shared resource. As a result, either P2 or P0 will be granted access to the resource and the other processor must wait.

An arbiter 850 located within the lock controller 800 (FIG. 8) is invoked to resolve such a conflict to the shared resource. The arbiter is preferably configured to resolve multiple requests simultaneously and, in the case of collisions, grants the resource to the processor according to a predetermined arbitration policy. In the illustrative embodiment, the arbiter 850 implements a first-come, first-serve arbitration priority policy. Alternatively, for the TMC architecture implementation that provides a staggered, shifted phase relationship among processors of a column, a priority policy may be implemented whereby P0 has priority over other processors of a column. In the absence of such a staggered phase relationship among the columned processors, a round robin or similar arbitration scheme may be implemented for resolving conflicts to the shared resource.

Assume that resolution of the conflict between P0 and P2 results in granting of the resource P0 and denial of the resource to P2. Rather than stalling P2 until the locked region is available, it is desirable to allow that processor to perform useful work until the requested resource is unlocked. To that end, the request for a lock is preferably decoupled from testing of the lock to thereby enable the processor to perform other activities. This is manifested by way of two separate instructions: one for requesting the lock and the other for testing the lock. Testing of the lock is manifested through use of condition bits of a condition code register 412 residing within the TMC processor 410. This enables a tightly coupled arrangement between the testing of the lock and the processor. By decoupling the testing of the lock from the request for the lock, the processor that was denied access can perform other activities and occasionally "poll" on the test lock to determine whether the area is available.

Figure 7:
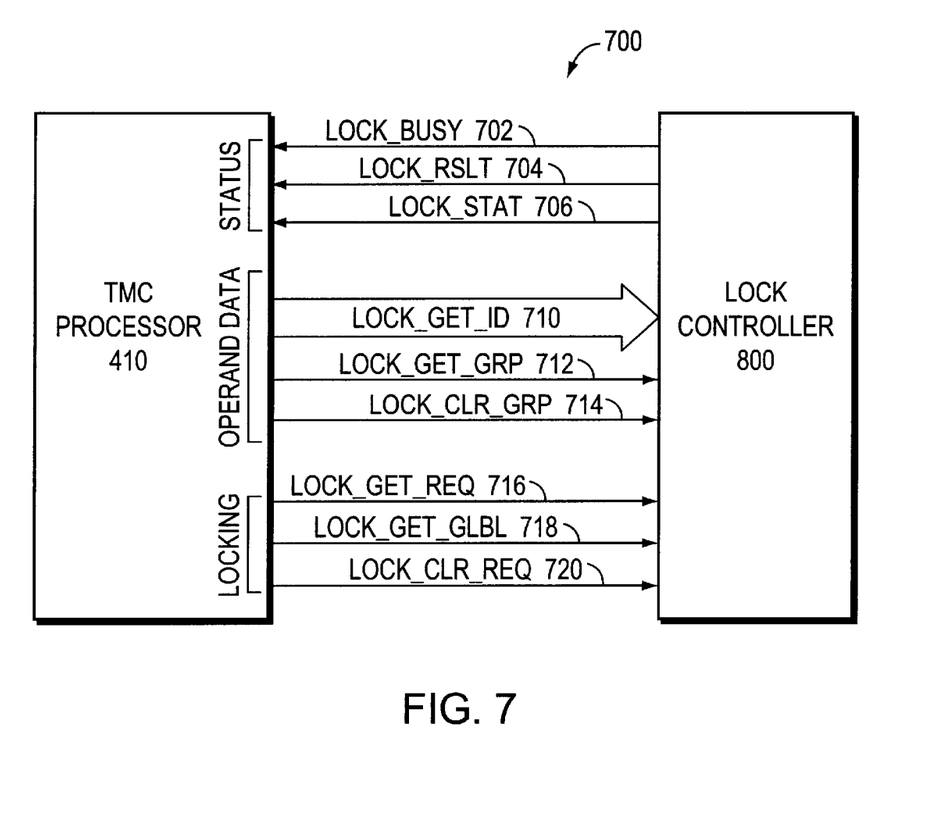
FIG. 7 is a schematic diagram illustrating a physical interface between the TMC processor and a novel lock controller.

FIG. 7 is a schematic diagram illustrating the physical interface (i.e., the actual signals that are exchanged) between the TMC core 410 and the lock controller 800. The signals include a 12-bit lock_et_id signal 710 that carries the virtual identifier value of the locked area and a 4-bit lock_get_grp signal 712 that specifies the requested locking group. The signal 712 is preferably a bit-map as opposed to an actual value because, as described further herein, the invention allows locking of multiple functions (groups) with a single lock request. That is, two interrelated functions (e.g., tables) may be locked by a single lock request for an area (e.g., 123) that specifies both functions (e.g., G0 and G1).

The lock controller 800 may embody either a direct mapped implementation or an implementation wherein a plurality of addresses are consumed within a single lock. For the direct mapped implementation, the shared resource is divided into a number of locking regions corresponding directly to the addressing space of the locking variable. That is, for a 12-bit virtual identifier there are a total of 4,096 possible locking regions. The resource is thus divided into 4,096 regions, wherein each locking value directly corresponds to a region. For example, virtual identifier value 123 corresponds to region 123 of the 4,096 regions.

On the other hand, a lock controller arrangement is provided wherein a shared resource has, e.g., 16,000 addresses and the virtual semaphore identifer (and its corresponding 4,096 locking areas) are distributed over that shared resource. Here, four addresses are contained within each locking region. If a processor issues a lock request to, e.g., address 441, then the actual lock issued by the lock controller isolates a 4-address area comprising, e.g., addresses 440, 441, 442 and 443. In other words, the resource is divided into 4,000 locking areas such that there is a 4-to-1 ratio between addresses and a locking area.

FIG. 8 is a highly schematic block diagram of lock controller 800 and, in particular, logic circuitry used to implement the locking arrangement according to the present invention. The logic circuitry 800 comprises lock state variables that are manipulated in accordance with lock requests issued by processors to determine whether there are conflicts for a particular shared resource. Notably, these lock state variables reside in the lock controller as opposed to external memory to thereby extend usable memory bandwidth by not requiring memory access cycles to obtain a lock. As described herein, the lock controller and mechanism associated with locking of various areas of a shared resource comprise a virtual semaphore aspect of the present invention.

In general for a direct map arrangement, a simple comparison is performed among the variables and requests to determine if there is a conflict. In the case of a multiple address per locking region arrangement, the requests are translated to the multiple of the locking arrangement prior to performing a comparison operation to determine whether there is a conflict. To that end, the arbiter 850 scans arbitration priority logic 860 and lock request logic 820 associated with each processor to determine the states for a current cycle and thereafter renders a decision as to which processor should be granted access to a shared resource.

More specifically, the lock request logic 820 associated with each processor holds any previously granted locks and any new requests for locks. The lock request logic 820 contains a 12-bit, virtual semaphore identifier (VSI) register 810 for each supported locking group; in addition the logic 820 includes valid (V) bits 812, each of which is associated with a corresponding VSI register 810 to determine whether a request has been issued for a particular group. The logic 820 also contains a plurality of type (T) bits 813, each of which is further associated with a VSI register 810 to indicate the type of lock request (e.g., a binary or virtual lock request).

In response to receiving a lock request from a processor 410 as indicated by the assertion of signals lock_et_grp 712 or lock_get_glbl 718, the appropriate V bits 812 are asserted based on the value of the lock_get_grp signals 712. The virtual semaphore identifier carried over the lock_get_id signal path 710 is then inserted into the corresponding VSI register(s) 810 and the corresponding T bits 813 are either asserted or not asserted to indicate whether the request is a binary or virtual request.

Each V bit 812 has a corresponding grant (G) bit 862 that indicates Whether the lock request issued by the processor has been granted. For a first-come, first-serve priority scheme, there are a plurality of priority bits 865 associated with each lock request logic 820 wherein each bit 865 corresponds to one of the remaining processors of a column. In the event the G bit is asserted for a particular processor, states of the priority bits indicate whether the remaining processors have previously issued lock requests that have not been granted and that are pending. Collectively, the G bits 862 and the priority bits 865 comprise the arbitration priority logic 860 associated with the predetermined arbitration policy.

Another aspect of the invention involves the ability of a processor to request more than one lock at the same time. The TMC architecture defines a get virtual semaphore instruction (xgvs) that includes two parameters: a group bit-map value and a locking value associated with a particular region. Specifically, the xgvs instruction includes a 4-bit group select (grp_sel) parameter and a reference to a GPR (e.g., Rsl) whose contents include the virtual identifer value (xgvs grp_sel,Rsl). A GPR contains the identifier because the value is typically computed in accordance with a previous instruction. An example of generic assembler notation for a program code segment involving the xgvs instruction is as follows:

(i1) add R3←R4, R6
(i2) shr R7←2, R3
(i3) xgvs 1000, R7

The i1 instruction is an add instruction wherein the contents of register R4 are added to the contents of R6 and the result is stored in R3. Here, R4 functions as a base register whose contents point to, e.g., a shared resource table in ICM 380 and the contents of R6 include a displacement "index" into that table which, illustratively, embodies a multiple address per locking region arrangement. Thus, the i1 instruction computes the address of a locking area in the table and stores that address in R3. However, this is not the actual virtual semaphore value because there are a plurality of addresses within the granular locking region.

Consequently, a subsequent i2 instruction is executed to translate the value into a locking region. This instruction is a shift-right instruction wherein the contents of R3 are shifted 2 places to the right and the result is stored in R7. The i3 instruction is the xgv instruction wherein the grp_sel parameter comprises the value 1000 (denoting locking of group G0) and the contents of R7 contain the actual address of the virtual semaphore. Execution of the xgvs instruction results in the TMC processor driving (i) the contents of R7 over the lock_get_id signal path 710 and (ii) the grp_sel parameter 1000 over the lock_get_grp signal path 712 and (iii) asserting the lock_get_req signal 716 to the lock controller 800.

Upon receiving these signals from the TMC core 410, the lock controller 800 loads the lock request information into the lock request logic 820 corresponding to the TMC processor. Specifically, the controller loads the information carried over the lock_get_id signal path 710 into the VSI register 810 corresponding to the group specified by the lock_get_grp signals 712. In addition, the corresponding T bit 813 is asserted to indicate a virtual request and the V bit 812 corresponding to the selected group is asserted. The lock controller 800 de-asserts (e.g., clears) the G bit 862 corresponding to the asserted V bit 812 and asserts the appropriate priority bits 865 to denote the pending request on behalf of the processor for the particular resources. These priority bits 865 are used to denote the oldest pending request for purposes of arbitration for the resources. Given the states of these logic bits, the arbiter 850 (which recomputes these states every cycle) determines which processor may gain access to the shared resource(s) for the next cycle and, accordingly, sets the G bit 862 associated with that processor and requested group. The G bit is then returned to the processor over the lock_stat signal path 706 and reflected in an appropriate condition bit for testing purposes.

Once the processor has completed updating a locked area it clears the lock in accordance with a clear semaphore xcs instruction. The xcs instruction has a grp_sel argument (parameter) indicating the group/region to be unlocked (xcs grp_sel). The grp_sel signals are transported to the lock controller 800 over the lock_clr_grp signal path 714. Effectively, the xcs instruction clears the V bit 812 that was asserted for a particular processor when locking the region denoted by the contents of the VSI register 810.

As noted, the RP I/F 322 may be used by the RP 320 to access all internal registers of the TMC processors 410, their context memories 435, IRAMs 420, external memories 280 and ICMs 380. As with each processor of a column, the RP may issue lock requests, particularly when a massive update (e.g., statistic updates) is required for a particular table. For example, when adding a new interface to the IP address-to-interface translation table, the RP 320 may issue a lock request to access the translation table resource. In this case, it would be desirable to lock the entire table as opposed to locking individual regions, primarily because that allows the RP to initialize a plurality of I/O ports at once. Rather than issuing a lock request to a particular virtual semaphore number, the processor may issue a get binary semaphore (xgbs) instruction that includes only a grp_sel parameter (xgbs grp_sel).

According to the invention, the xgbs instruction locks the entire group (function) denoted by the bit mapped value. For example, in order to lock an entire function G0, the xgbs instruction specifies a grp_sel parameter of "1000." The term binary denotes either is locking the entire function or not locking the entire function (as opposed to locking/ unlocking a portion of the function). The lock_get_glbl signal 718 is transported with the lock request to the lock controller 800; the lock_get_glbl signal indicates whether the request is a binary or virtual lock request.

Other signals transported over the interface 700 include the lock_stat signal 706 representing the grant signal returned to the processor 410 from the lock controller 800, and lock_busy and lock_rslt signals 702, 704 indicating whether the lock controller is done with the request. These latter signals are generated by the arbitration logic 860 and loaded into the appropriate condition code register for testing purposes.

In summary, an aspect of the present invention involves the use of a virtual semaphore mechanism that allows specification of a virtual semaphore identifier corresponding to a portion of a shared resource that may be locked, as opposed to locking the entire resource. This enables a plurality of processors to access the shared resources simultaneously and thereby increase the performance of the system. The GVLM advantageously provides an efficient means to obtain locks for multiple exclusive resources or shared multi-access resources. The invention also enhances interprocessor synchronization for tightly coupled processors. The GVLM invention is efficient in terms of lock acquisition and release times, and also requires less memory bandwidth as compared to prior implementations.

While there has been shown and described an illustrative embodiment for addressing synchronization in a system having resources that are shared by a plurality of processors, it is to be understood that various other adaptations and modifications may be made within the spirit and scope of the invention. For example, another aspect of the invention involves the ability of a single processor to request locking of multiple functions at the same time (i.e., simultaneous requests for multiple exclusive resources). This situation may arise because the functions are tied together (interrelated); in that case, the invention provides a means for avoiding a deadlock situation. That is, the invention involves an atomic operation that ensures that multiple resources are locked at the same time; otherwise a situation arises whereby only one resource is available for locking by the processor while another processor attempts to lock the resource. A resulting deadlock situation prevents either processor from simultaneously locking the interrelated resources.

Accordingly, the invention does not allow a single processor to lock multiple resources unless all of those resources are simultaneously available. The processor can determine whether the resources are available for locking by constantly testing the condition codes associated with the resources.

An example of the simultaneous requests for multiple exclusive resources is the xgbs (get binary semaphore) instruction specifying two functions to be locked: xgbs 1100. Another example of such a request involves use of the xgvs (get virtual semaphore) instruction: xgvs 1100, R7. The main difference between these two instructions is that the xgbs instruction locks an entire function, whereas the xgvs function only locks the particular region specified by the virtual semaphore identifier. In both cases, however neither specified region will be locked unless both regions specified in the instruction are available to be locked simultaneously.

Referring again to FIGS. 3–8, the operation of the simultaneous requests for multiple exclusive resources aspect of the present invention will be described. Assume that a processor 410 has issued a lock request for two resources and, in accordance with processing of that request, the lock controller 800 determines that at least one of those resources is unavailable for locking at that time. The controller 800 proceeds to set the aged/priority bits 865 of the arbitration logic 860 to denote a pending request on behalf of the processor for the particular resources. These priority bits 865 are used to denote the oldest pending request for purposes of arbitration for a particular resource.

Because the arbiter 850 must consider that both functions must be available for locking simultaneously on behalf of a processor's request, it is possible that granting of simultaneous requests for multiple exclusive resources may take some time. Consequently, it is desirable to utilize the xgvs instruction with the virtual semaphore when seeking multiple locking area requests rather than the binary approach (xgbs) because the more granular requests have a better likelihood of being realized sooner.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for enabling a plurality of threads of execution to simultaneously access a shared resource of a programmable processor, comprising:
   a lock controller associated with a plurality of threads of execution; and
   a lock instruction, the lock instruction executed by a particular thread of execution of the plurality of threads of execution when the particular thread requires a lock in the shared resource, the lock instruction cooperating with the lock controller to generate a lock request to the shared resource, the lock request merged with group information from other threads of execution requesting a lock, the lock controller thereby managing requests by the plurality of threads of execution for the shared resource.

2. The apparatus as in claim 1, further comprising:
   each thread of execution of the plurality of threads of execution executing in a different processor.

3. The apparatus as in claim 1, further comprising:
   each thread of execution of the plurality of threads of execution executing in a different processor of an array of processors, the array arranged in rows and columns, and the lock controller associated a column of the array.

4. The apparatus as in claim 1, further comprising:
   all threads of execution of the plurality of threads of execution executing in one processor.

5. The apparatus as in claim 1, further comprising:
   the lock request includes a virtual semaphore identifier specifying at least one region of the shared resource for access by the processor.

6. The apparatus as in claim 1, further comprising:
   the lock instruction is a get virtual semaphore (xgvs) instruction that allows a processor to obtain a virtual lock.

7. The apparatus as in claim 6, further comprising:
   the xgvs instruction includes a group select parameter and a reference to a register storing the virtual semaphore identifier.

8. The apparatus as in claim 7 further comprising:
   a clear semaphore (xcs) instruction that clears the virtual lock, the xcs instruction including a group select parameter indicating the region to be unlocked.

9. The apparatus as in claim 1, further comprising:
   the lock instruction is a get binary semaphore instruction that allows a processor to lock the entire resource.

10. The apparatus as in claim 1, further comprising:
    the lock instruction requests locking of multiple shared resources at the same time.

11. The apparatus as in claim 1, further comprising:
    the lock instruction is one of a get virtual semaphore (xgvs) instruction and a get binary semaphore (xgbs) instruction that simultaneously specifies multiple regions to be locked, thereby avoiding a deadlock situation.

12. A method for accessing a shared resource of a processor, comprising:
    associating a plurality of threads of execution with a lock controller;
    executing a lock instruction, the lock instruction executed by a particular thread of execution of the plurality of threads of execution when the particular thread requires a lock in the shared resource, the lock instruction cooperating with the lock controller to generate a lock request to the shared resource; and
    merging the lock request with group information from other threads of execution requesting a lock, the lock controller thereby managing requests by the plurality of threads of execution for the shared resource.

13. The method of claim 12, further comprising:
    executing each thread of execution of the plurality of threads of execution in a different processor.

14. The method of claim 12, further comprising:

executing each thread of execution of the plurality of threads of execution in a different processor of an array of processors, the array arranged in rows and columns, and the lock controller associated a column of the array.

15. The method of claim 12, further comprising:

executing all threads of execution of the plurality of threads of execution in one processor.

16. The method of claim 12, further comprising:

specifying by the lock request a virtual semaphore identifier which specifies at least one region of the shared resource for access by the processor.

17. The method of claim 12, further comprising:

specifying the lock instruction as a get virtual semaphore (xgvs) instruction that allows a processor to obtain a virtual lock.

18. The method of claim 17, further comprising:

specifying the xgvs instruction to include a group select parameter and a reference to a register storing the virtual semaphore identifier.

19. The method of claim 17, further comprising:

specifying a clear semaphore (xcs) instruction that clears the virtual lock, the xcs instruction including a group select parameter indicating the region to be unlocked.

20. The method of claim 12, further comprising:

specifying the lock instruction as a get binary semaphore instruction that allows a processor to lock the entire resource.

21. The method of claim 12, further comprising:

the lock instruction requests locking of multiple shared resources at the same time.

22. The method of claim 12, further comprising:

specifying the lock instruction as one of a get virtual semaphore (xgvs) instruction and a get binary semaphore (xgbs) instruction that simultaneously specifies multiple regions to be locked, thereby avoiding a deadlock situation.

23. Apparatus for enabling a plurality of threads of execution to simultaneously access a shared resource of a programmable processor, comprising:

means for associating the plurality of threads of execution with a lock controller;

means for executing a lock instruction, the lock instruction executed by a particular thread of execution of the plurality of threads of execution when the particular thread requires a lock in the shared resource, the lock instruction cooperating with the lock controller to generate a lock request to the shared resource; and means for merging the lock request with group information from other threads of execution requesting a lock, the lock controller thereby managing requests by the plurality of threads of execution for the shared resource.

24. The apparatus of claim 23, further comprising:

means for executing each thread of execution of the plurality of threads of execution in a different processor.

25. The apparatus of claim 23, further comprising:

means for executing each thread of execution of the plurality of threads of execution in a different processor of an array of processors, the array arranged in rows and columns, and the lock controller associated a column of the array.

26. The apparatus of claim 23, further comprising:

means for executing all threads of execution of the plurality of threads of execution in one processor.

27. A computer readable media, comprising:

said computer readable media having instructions written thereon for execution on a processor for the practice of the method of claim 12.

28. Electromagnetic signals propagating on a computer network, comprising:

said electromagnetic signals carrying instructions for execution on a processor for the practice of the method of claim 12.

* * * * *